(12) United States Patent
Oohashi

(10) Patent No.: US 8,193,667 B2
(45) Date of Patent: Jun. 5, 2012

(54) AUTOMOTIVE ALTERNATOR

(75) Inventor: Atsushi Oohashi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 308 days.

(21) Appl. No.: 12/595,179

(22) PCT Filed: May 22, 2007

(86) PCT No.: PCT/JP2007/060421
§ 371 (c)(1), (2), (4) Date: Oct. 8, 2009

(87) PCT Pub. No.: WO2008/142779
PCT Pub. Date: Nov. 27, 2008

(65) Prior Publication Data
US 2011/0175469 A1      Jul. 21, 2011

(51) Int. Cl.
*H02K 9/06* (2006.01)
(52) U.S. Cl. .............. 310/68 D; 310/68 C; 310/239; 310/58
(58) Field of Classification Search ............. 310/68 D, 310/68 C, 68 R, 239, 58–59, 60
See application file for complete search history.

(56) References Cited

U.S. PATENT DOCUMENTS

| | | | |
|---|---|---|---|
| 5,686,780 A | 11/1997 | Adachi et al. | |
| 6,114,783 A * | 9/2000 | Asao | 310/58 |
| 6,735,071 B2 * | 5/2004 | Oohashi et al. | 361/306.1 |
| 2001/0030472 A1 | 10/2001 | Ihata | |
| 2002/0050750 A1 * | 5/2002 | Oohashi et al. | 310/68 D |

FOREIGN PATENT DOCUMENTS

| | | |
|---|---|---|
| JP | 64-085566 A | 3/1989 |
| JP | 01-099451 A | 4/1989 |
| JP | 08-251889 A | 9/1996 |
| JP | 3098223 A | 6/2000 |
| JP | 2001-298907 A | 10/2001 |
| JP | 2002-142423 A | 5/2002 |
| JP | 2005-253184 A | 9/2005 |

OTHER PUBLICATIONS

Korean Office Communication dated Feb. 21, 2011, corresponding to Korean Patent Application No. 10-2009-7018852.

* cited by examiner

*Primary Examiner* — Quyen Leung
*Assistant Examiner* — Leda Pham
(74) *Attorney, Agent, or Firm* — Sughrue Mion, PLLC

(57) ABSTRACT

An automotive alternator is provided that reduces exclusive circumferential space for a regulator assembly inside a rear bracket, and that also increases performance in cooling the regulator assembly and a rectifier by ensuring that flows of air that cool the regulator assembly and the rectifier do not interfere with each other.
An approximately C-shaped rectifier is disposed in a vicinity of a rotating shaft, and a regulator assembly is disposed between two end portions of the approximate C shape of the rectifier. A brush holder portion, a regulator circuit housing portion, and a connector portion that constitute a regulator assembly are positioned such that respective center lines thereof are in a common plane that includes a central axis of the rotating shaft. A partitioning wall is disposed so as to project from an inner wall surface of the rear bracket so as to separate a rectifier cooling airflow passage for cooling the rectifier and a regulator circuit cooling airflow passage for cooling the regulator circuit by stopping circumferential flow of air that is sucked in through the suction aperture to cool the rectifier and the regulator circuit respectively.

4 Claims, 8 Drawing Sheets

AUTOMOTIVE ALTERNATOR

TECHNICAL FIELD

The present invention relates to an automotive alternator and particularly relates to an automotive alternator that improves cooling performance of a rectifier and a regulator assembly in which are configured integrally a brush holder portion in which a current-supplying brush is held, a connector portion to which an external connector is connected, and a regulator circuit housing portion in which a regulator circuit is housed.

BACKGROUND ART

In conventional automotive alternators, regulator assemblies in which a brush holder portion in which current-supplying brushes are held, a connector portion to which an external connector is connected, and a regulator circuit housing portion in which a regulator circuit is housed are configured integrally have been disposed inside a rear bracket so as to be positioned between end portions of an approximate C shape of a rectifier and have been fixed (see Patent Literature 1, for example).
Patent Literature 1: Japanese Patent No. 3098223 (Gazette)

DISCLOSURE OF THE INVENTION

Problem to be Solved by the Invention

In conventional automotive alternators, the connector portion is positioned on one side of the regulator circuit housing portion and the brush holder portion. Thus, when the regulator assembly is disposed inside the rear bracket so as to be perpendicular to a central axis of a rotating shaft, the regulator assembly extends over a wide area in a circumferential direction. Consequently, installation space is reduced for a rectifier that is disposed inside the rear bracket on a plane identical to that of the regulator assembly, and area of a heatsink that constitutes the rectifier is reduced, reducing heat radiation and making cooling efficiency poor.

The present invention aims to solve the above problems and an object of the present invention is to provide an automotive alternator that reduces exclusive circumferential space for a regulator assembly inside a rear bracket, and that also increases performance in cooling the regulator assembly and a rectifier by ensuring that flows of air that cool the regulator assembly and the rectifier do not interfere with each other.

Means for Solving the Problem

In order to achieve the above object, according to one aspect of the present invention, there is provided an automotive alternator including: a rotor that is fixed to a rotating shaft; a cooling fan that is fixed to an axial end surface of the rotor; a stator that is disposed outside the rotor so as to surround the rotor; a front bracket and a rear bracket that rotatably support the rotating shaft and that fix the stator, and in which are formed a suction aperture that sucks in air by action of the cooling fan and a discharge aperture that discharges the air that has been sucked in; a rectifier that has: an approximately C-shaped rectifier heatsink to which a plurality of diodes are mounted; and a resin circuit board in which the plurality of diodes are connected by insert conductors so as to constitute a rectifier circuit, the rectifier being mounted to the rear bracket so as to be disposed around the rotating shaft in an approximate C shape and rectifying alternating-current output that is generated by the stator into direct current; a regulator circuit that is fixed to a regulator heatsink, and that adjusts magnitude of alternating-current voltage that is generated by the stator; a regulator assembly that has a base into which is integrally molded: a brush holder portion that is disposed so as to face the rotor such that an aperture direction of a brush insertion aperture is aligned in a radial direction and that holds a brush inside the brush insertion aperture; a regulator circuit housing portion that is disposed on a rear bracket side of the brush holder portion such that a resin injection aperture faces radially outward, and that houses and holds the regulator circuit such that fins of the regulator heatsink are oriented toward the rear bracket; and a connector portion that is disposed on a rear bracket side of the brush holder portion, the regulator assembly being mounted to the rear bracket such that the base is disposed between two end portions of the approximate C shape of the rectifier. The brush holder portion, the regulator circuit housing portion, and the connector portion are formed so as to be positioned such that respective center lines thereof are in a common plane that includes a central axis of the rotating shaft, and a partitioning wall is disposed so as to project from an inner wall surface of the rear bracket so as to separate a rectifier cooling airflow passage for cooling the rectifier and a regulator circuit cooling airflow passage for cooling the regulator circuit by stopping circumferential flow of the air that is sucked in through the suction aperture to cool the rectifier and the regulator circuit respectively.

Effects of the Invention

According to the present invention, because the brush holder portion, the regulator circuit housing portion, and the connector portion are formed so as to be positioned such that respective center lines thereof are in a common plane that includes a central axis of the rotating shaft, exclusive circumferential space for the base can be reduced, increasing exclusive circumferential area for the rectifier proportionately. Heat radiating area of the rectifier heatsink is thereby increased, increasing heat radiation, thereby increasing cooling efficiency.

Because the rectifier cooling airflow passage for cooling the rectifier and the regulator circuit cooling airflow passage for cooling the regulator circuit are separated by the partitioning wall, flows of air that have cooled the rectifier and the regulator circuit are smoothed axially without interfering with each other, eliminating reverse flow of air that has performed cooling, and also reducing pressure loss, thereby improving cooling performance.

BEST MODE FOR CARRYING OUT THE INVENTION

Figure 1:
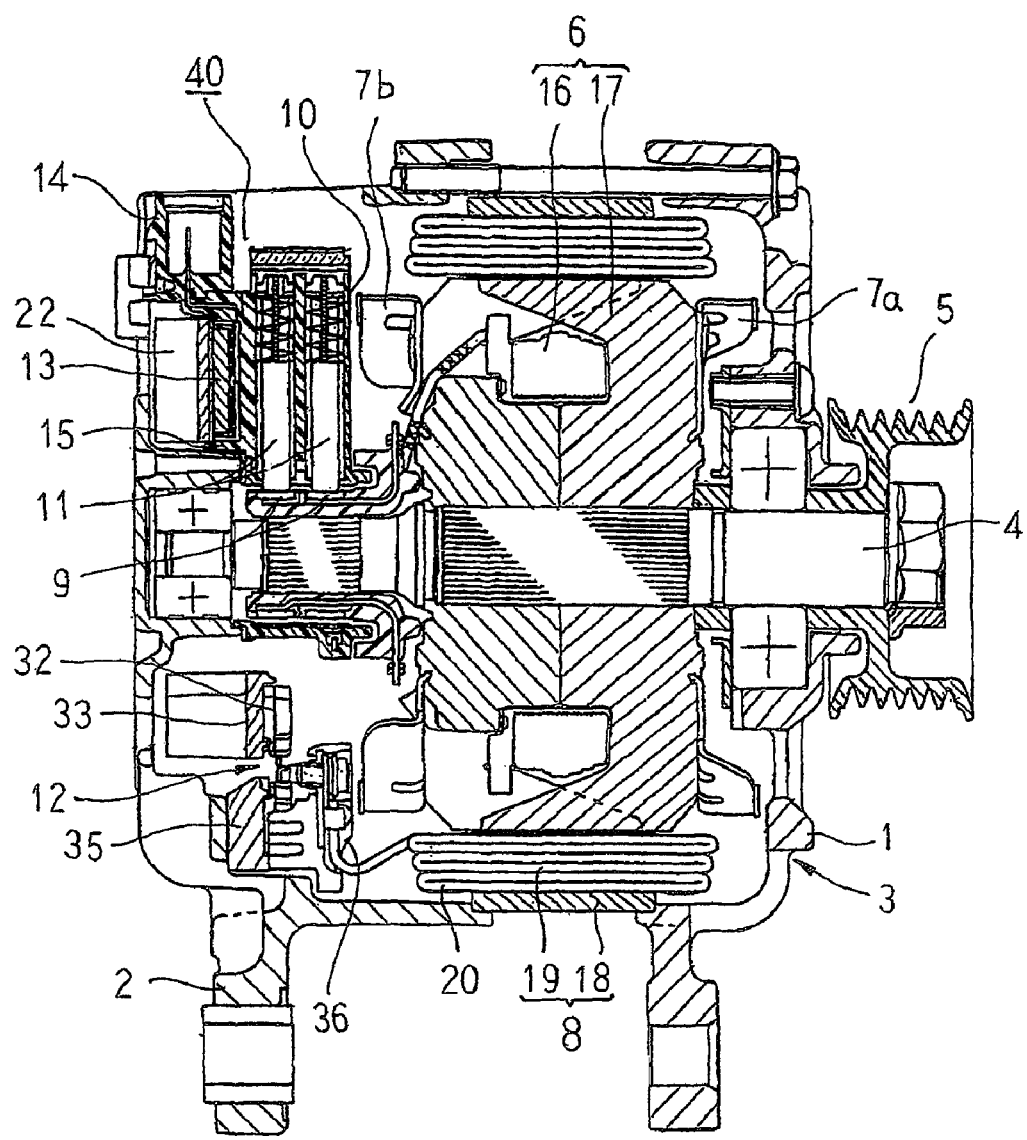
FIG. 1 is a cross section that shows an overall configuration of an automotive alternator according to a preferred embodiment of the present invention.

FIG. 1 is a cross section that shows an overall configuration of an automotive alternator according to a preferred embodiment of the present invention.

In FIG. 1, an automotive alternator includes: a case 3 that is constituted by a front bracket 1 and a rear bracket 2 that are each approximately bowl-shaped and made of aluminum; a rotating shaft 4 that is rotatably supported at a central axial position of the case 3; a pulley 5 that is fixed to a first end of the rotating shaft 4 that projects outward at a front end of the case 3; a claw-pole rotor 6 that is fixed to the rotating shaft 4 so as to be rotatably disposed inside the case 3; a stator 8 that is held by an inner wall surface of the case 3 so as to surround the rotor 6; a pair of slip rings 9 that are fixed to a second end portion of the rotating shaft 4 so as to supply electric current to a rotor coil 16 of the rotor 6; a brush holder portion 10 that is disposed radially outside the slip rings 9; brushes 11 that are disposed inside the brush holder portion 10 so as to slide in contact with the respective slip rings 9; a rectifier 12 that is electrically connected to a stator coil 19 of the stator 8 so as to rectify alternating current that is generated in the stator coil 19 into direct current; a regulator circuit 13 that adjusts magnitude of alternating voltage that is generated in the stator coil 19; and a connector portion 14 to which an external connector can be mounted.

The rotor 6 has: a rotor coil 16 that generates magnetic flux on passage of electric current; and a pole core 17 that is disposed so as to cover the rotor coil 16 and in which magnetic poles are formed by the magnetic flux. The rotating shaft 4 is inserted through a central axial position of the pole core 17 and fixed. Cooling fans 7a and 7b are fixed to two axial end surfaces of the pole core 17.

The stator 8 includes: a stator core 18 that is held between the front bracket 1 and the rear bracket 2 and that is disposed so as to surround the rotor 6; and a stator coil 19 that is mounted to the stator core 18. The stator coil 19 is prepared by installing conductor wires in slots of the stator core 18. The conductor wires extend outward from the slots of the stator core 18 at two axial ends of the stator core 18 to constitute coil ends 20. Portions of the conductor wires that are housed inside the slots of the stator core 18 are formed so as to have rectangular cross sections. Here, a rotating magnetic field is applied to the stator coil 19 by rotation of the rotor 6, generating electromotive force in the stator coil 19.

Figure 2:
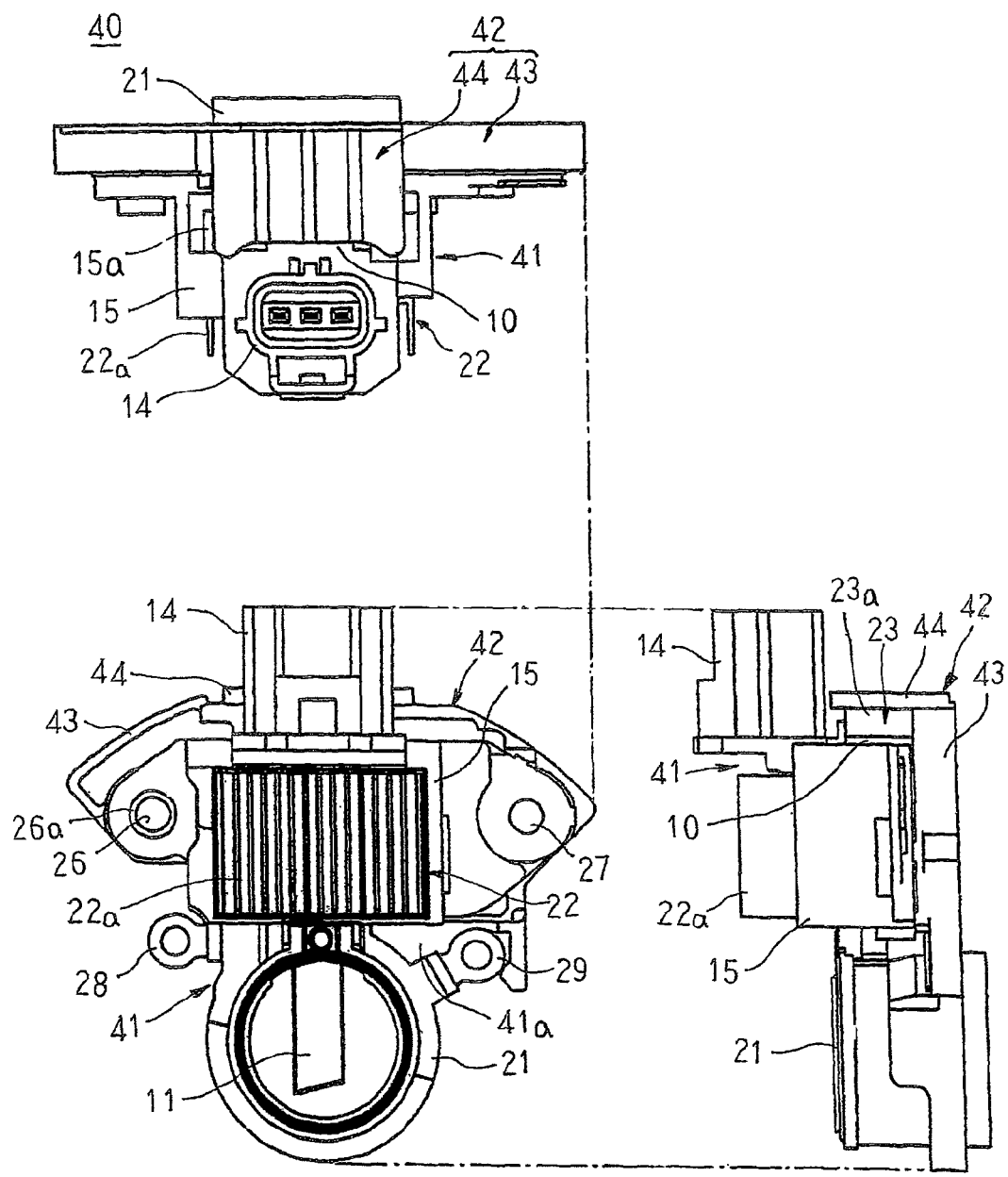
FIG. 2 is a front elevation, a top plan and a right side elevation of a regulator assembly that can be used in the automotive alternator according to the preferred embodiment of the present invention.
Figure 3:
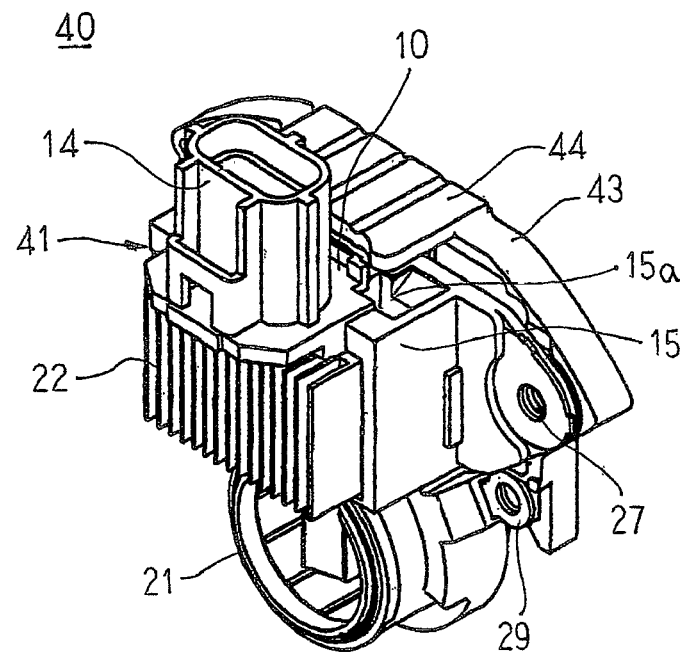
FIG. 3 is a perspective of the regulator assembly that can be used in the automotive alternator according to the preferred embodiment of the present invention.
Figure 4:
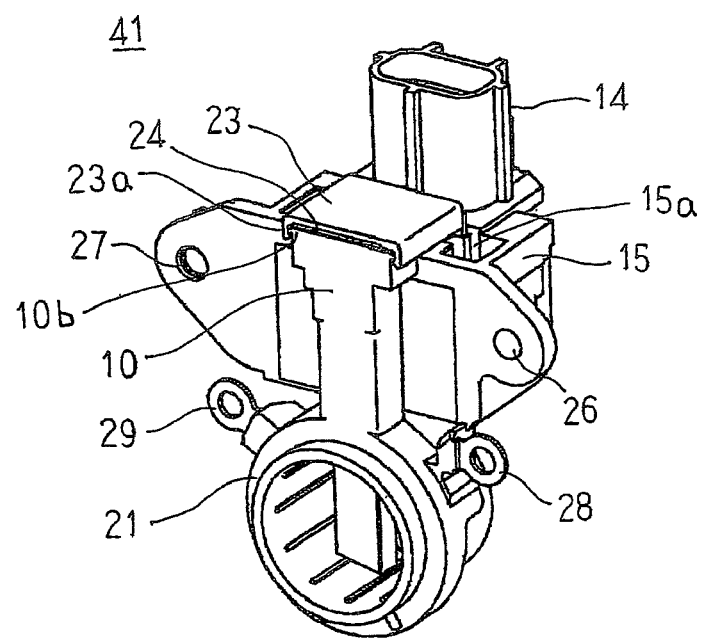
FIG. 4 is a perspective of a base that constitutes the regulator assembly that can be used in the automotive alternator according to the preferred embodiment of the present invention.
Figure 5:
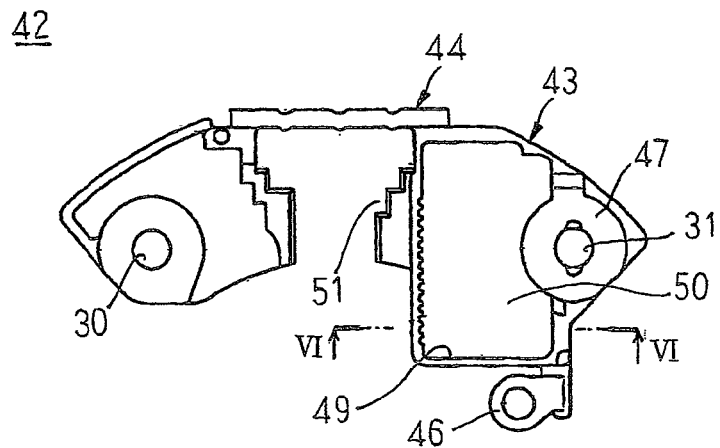
FIG. 5 is a rear elevation of a plate that constitutes the regulator assembly that can be used in the automotive alternator according to the preferred embodiment of the present invention.
Figure 6:
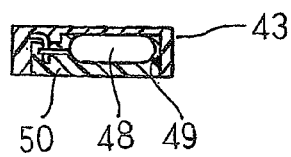
FIG. 6 is a cross section that is taken along line VI-VI in FIG. 5 so as to be viewed in the direction of the arrows.

Next, configuration of a regulator assembly 40 will be explained with reference to FIGS. 2 through 6. FIG. 2 is a front elevation, a top plan and a right side elevation of a regulator assembly that can be used in the automotive alternator according to the preferred embodiment of the present invention, FIG. 3 is a perspective of the regulator assembly, and FIG. 4 is a perspective of a base that constitutes a brush holder assembly. FIG. 5 is a rear elevation of a plate that constitutes the regulator assembly, and FIG. 6 is a cross section that is taken along line VI-VI in FIG. 5 so as to be viewed in the direction of the arrows.

The regulator assembly 40 includes: a base 41 into which the brush holder portion 10, the connector portion 14, a regulator circuit housing portion 15, and a hollow cylindrical slinger portion 21 are molded integrally using a polyphenylene sulfide (PPS) resin, for example; and a plate 42 that can be removably mounted onto the brush holder portion 10. Here, because a central axis of the slinger portion 21 is aligned with a central axis of the rotating shaft 4, a direction that is perpendicular to the central axis of the slinger portion 21 will be called a radial direction.

The brush holder portion 10 is disposed so as to extend radially from an outer circumferential surface of the slinger portion 21. Brush insertion apertures 10a are formed on the brush holder portion 10 so as to be separated in an axial direction of the slinger portion 21 and so as to face inside the slinger portion 21. The regulator circuit housing portion 15 is disposed so as to overlap with and be adjacent to the brush holder portion 10 at a first end of the brush holder portion 10 in the axial direction of the slinger portion 21. The connector portion 14 is disposed so as to be adjacent to the regulator circuit housing portion 15 radially outside the regulator circuit housing portion 15 such that an opening portion 14a faces radially outward. Respective center lines of the brush holder portion 10, the connector portion 14, and the regulator circuit housing portion 15 are positioned in a common plane that passes through the central axis of the slinger portion 21, i.e., the central axis of the rotating shaft 4. Ventilating apertures 41a are disposed through the base 41 radially inside the regulator circuit housing portion 15 on a first circumferential side of the brush holder portion 10.

The regulator circuit 13 is fixed to a heatsink 22 using adhesive, etc., and is housed and held inside the regulator circuit housing portion 15 from an opening of the regulator circuit housing portion 15 at a first axial end of the slinger portion 21. A plurality of fins 22a that extend radially are disposed so as to stand on a rear side of the heatsink 22. An insulating resin is injected so as to fill the regulator circuit housing portion 15 through a resin injection aperture 15a that is open on a radially outer side of the regulator circuit housing portion 15. The brushes 11 are inserted into the respective brush insertion apertures 10a of the brush holder portion 10, and are pressed toward the slinger portion 21 by forces from springs 25.

Caps that close the brush insertion apertures 10a are configured so as to have a two-layer construction that is constituted by a resin cap 23 and a rubber cap 24. The resin cap 23 is mounted by fitting two end recess portions 23a thereof from a radially upper end portion of the brush holder portion 10 into flange portions 10b that are disposed so as to protrude from two circumferential sides. The rubber cap 24 is fixed to an inner surface of the resin cap 23 and closes the respective brush insertion apertures 10a.

Fastening penetrating apertures 26 and 27 are disposed through the base 41, and a positioning protruding portion 26a is formed integrally on the base 41. In addition, electrode terminal portions 28 and 29 are formed so as to be exposed from the base 41 radially outside the slinger portion 21.

The plate 42 is molded using a PPS resin, for example, and has: a straightening vane portion 43 that has a front surface that is a flat surface; and a cover portion 44 that is disposed so as to extend at a right angle from the straightening vane portion 43 and that approximately covers the resin injection aperture 15a of the regulator circuit housing portion 15.

First ends of insert conductors that are insert molded into the plate 42 are exposed from the straightening vane portion 43 so as to form electrode terminal portions 46 and 47, and second ends project into a capacitor housing portion 49 that is recessed into a rear surface of the straightening vane portion 43. A noise-preventing capacitor 48 is connected to the end portions of the insert conductors that project into the capacitor housing portion 49, and is housed inside the capacitor housing portion 49. A filler resin 50 is injected into the capacitor housing portion 49 so as to embed the capacitor 48. In addition, fastening penetrating apertures 30 and 31 are disposed through the straightening vane portion 43 at positions that correspond to the penetrating apertures 26 and 27.

An interfitting portion 51 that fits together with the brush holder portion 10 is formed so as to have a partially stepped internal shape that conforms to an external shape of the radially upper end portion of the brush holder portion 10 in a vicinity of a root base portion of the cover portion 44 of the straightening vane portion 43. The plate 42 is mounted to the base 41 by fitting the interfitting portion 51 over the brush holder portion 10. The cover portion 44 thereby presses an upper end surface of the resin cap 23 so as to prevent the resin cap 23 from dislodging. The brush holder portion 10 and the straightening vane portion 43 are positioned approximately in a common plane so as to constitute a flat surface overall.

Figure 7:
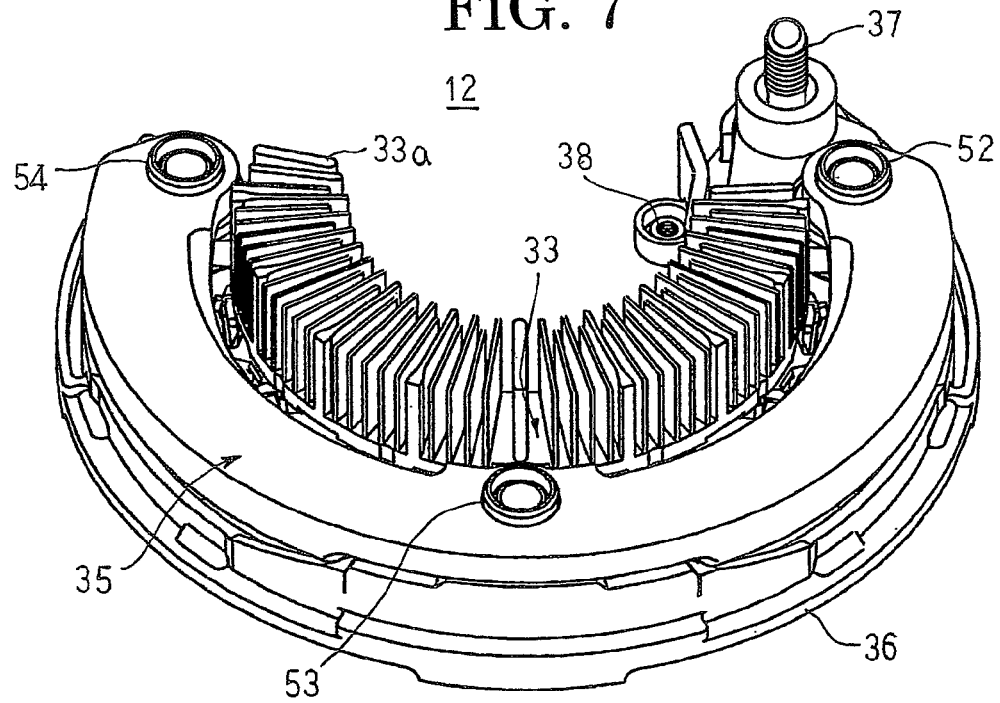
FIG. 7 is a perspective that shows a rectifier that can be used in the automotive alternator according to the preferred embodiment of the present invention.
Figure 8A:
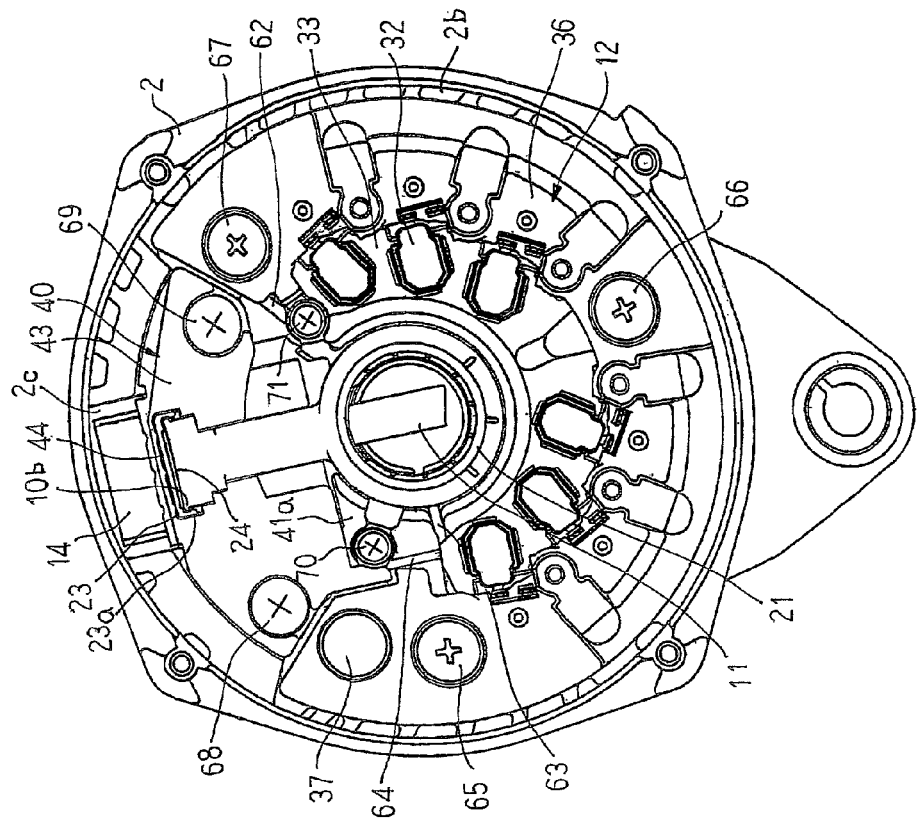
FIG. 8A is a front elevation that shows a mounted state of a rectifier and a regulator assembly in the automotive alternator according to the preferred embodiment of the present invention.
Figure 8B:
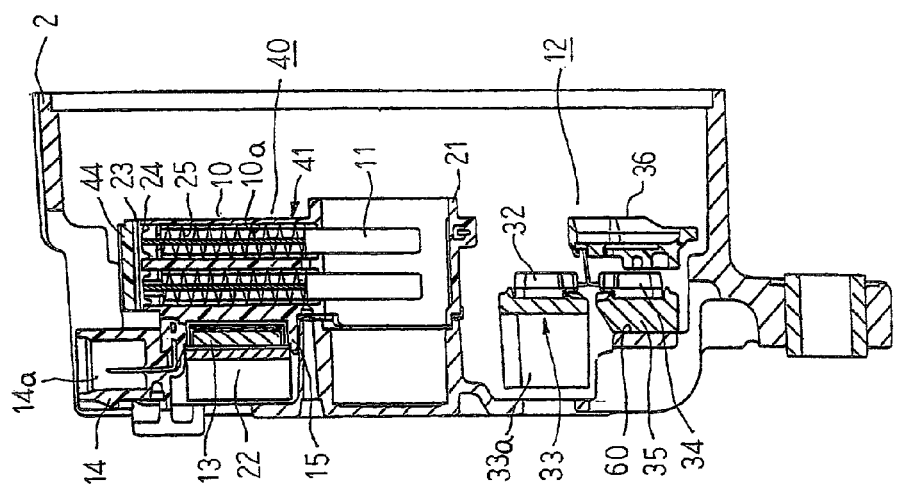
FIG. 8B is a cross section that shows a mounted state of the rectifier and the regulator assembly in the automotive alternator according to the preferred embodiment of the present invention.
Figure 9A:
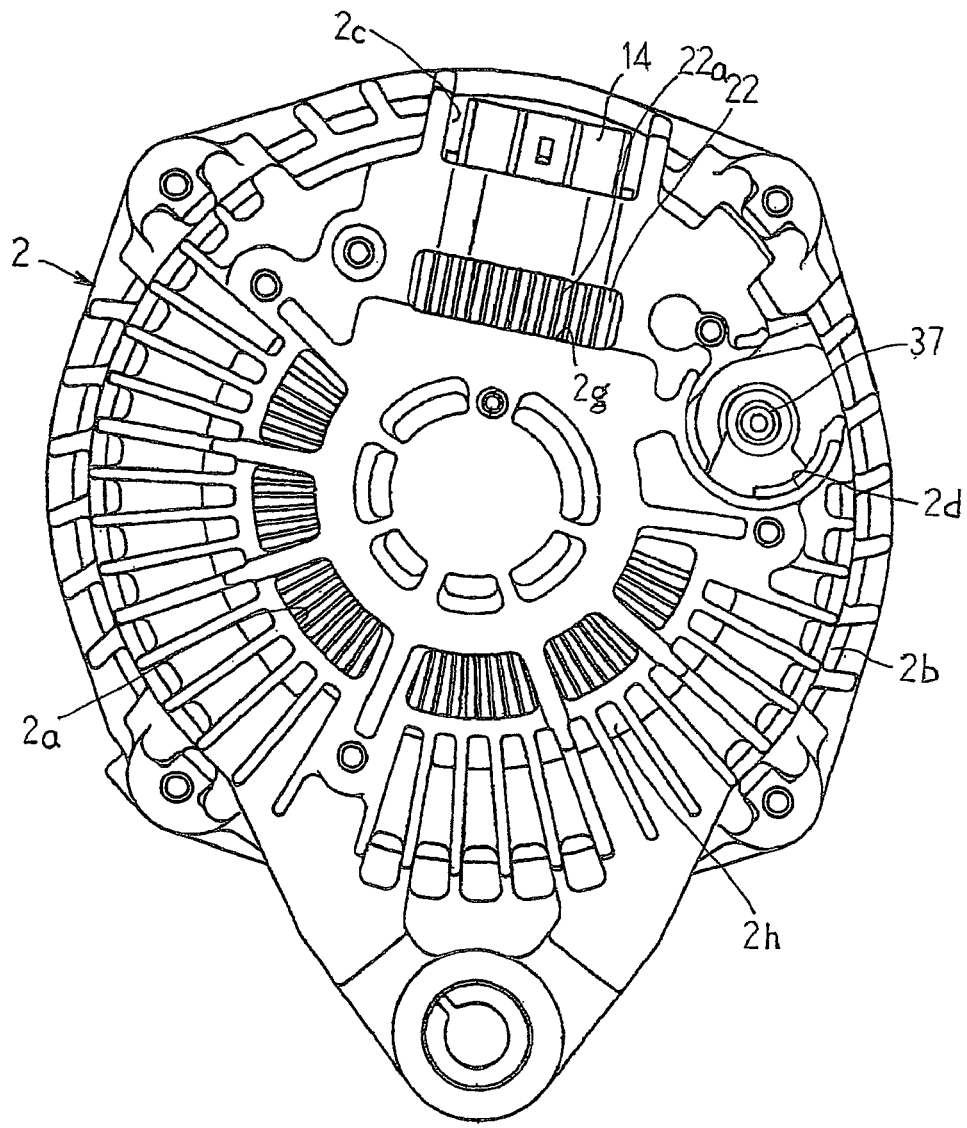
FIG. 9A is a rear-end end elevation that shows the automotive alternator according to the preferred embodiment of the present invention.
Figure 9B:
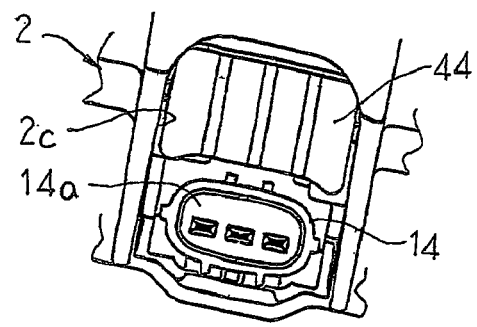
FIG. 9B is a top plan that shows a vicinity of a lead-through opening in the automotive alternator according to the preferred embodiment of the present invention.
Figure 10:
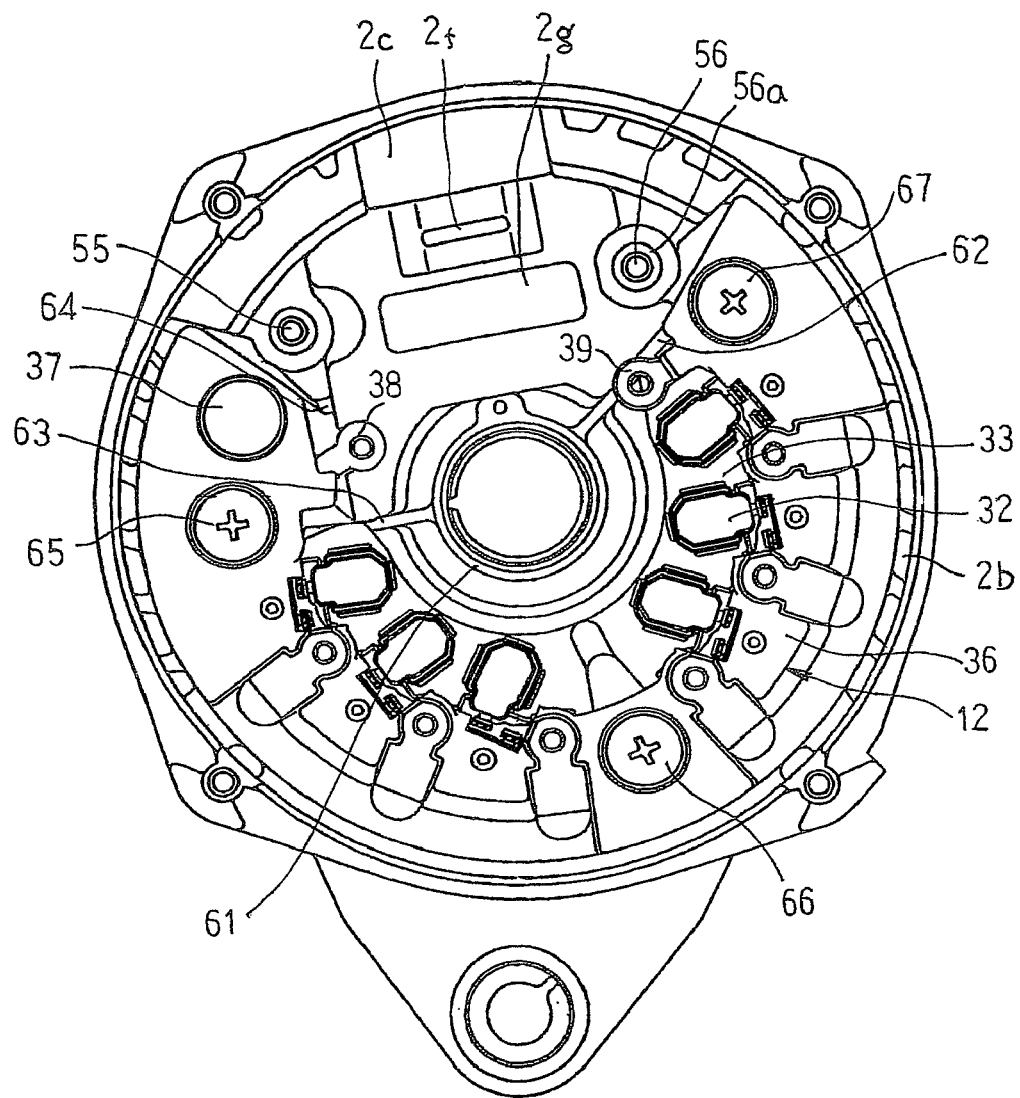
FIG. 10 is a front elevation that shows a mounted state of the rectifier in the automotive alternator according to the preferred embodiment of the present invention.
Figure 11:
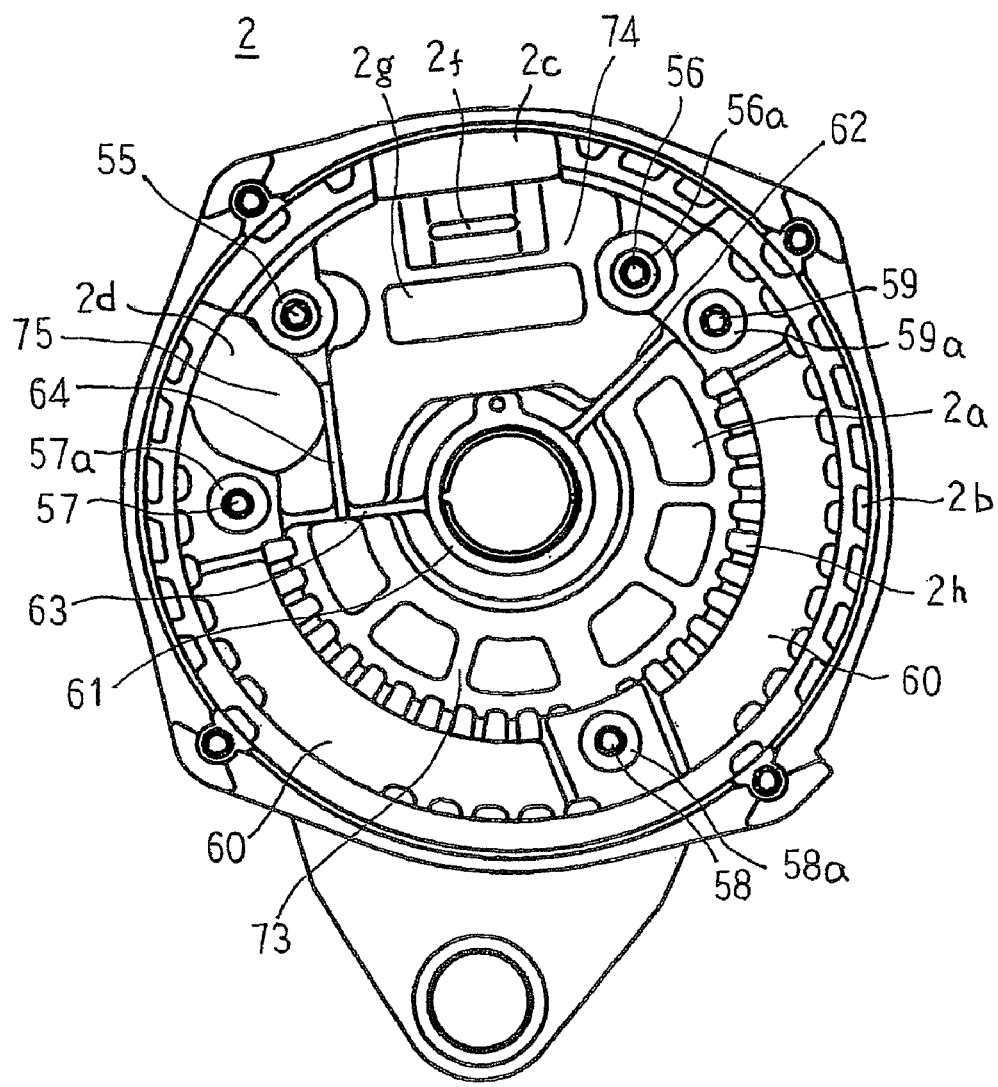
FIG. 11 is a diagram that shows a rear bracket in the automotive alternator according to the preferred embodiment of the present invention when viewed from inside.

Next, a mounted state of the rectifier 12 and the regulator assembly 40 will be explained. FIG. 7 is a perspective of a rectifier that can be used in the automotive alternator according to the preferred embodiment of the present invention. FIGS. 8A and 8B are a front elevation and a cross section, respectively, that show a mounted state of a rectifier and a regulator assembly in the automotive alternator according to the preferred embodiment of the present invention, FIG. 9A is a rear-end end elevation that shows the automotive alternator according to the preferred embodiment of the present invention, FIG. 9B is a top plan that shows a vicinity of a lead-through opening in the automotive alternator according to the preferred embodiment of the present invention, FIG. 10 is a front elevation that shows a mounted state of a rectifier in the automotive alternator according to the preferred embodiment of the present invention, and FIG. 11 is a diagram that shows a rear bracket in the automotive alternator according to the preferred embodiment of the present invention when viewed from inside.

The rectifier 12 includes: a positive-side heatsink 33 that is formed so as to have an approximate C shape, and that has positive-side diodes 32 mounted to the front surface; a negative-side heatsink 35 that is formed so as to have an approximate C shape, that is disposed concentrically in a common plane with the positive-side heatsink 33 radially outside the positive-side heatsink 33, and that has negative-side diodes 34 mounted to a front surface; a circuit board 36 that is formed so as to have an approximate C shape, and that is disposed so as to be stacked in front of the negative-side heatsink 35; and a B terminal bolt 37 that constitutes an output terminal of the rectifier 12, and that is held by press-fitting a knurl into the positive-side heatsink 33.

The positive-side and negative-side diodes 32 and 34 are connected by insert conductors that have been insert-molded into the circuit board 36 so as to constitute a rectifier circuit. The insert conductors also extend outward from the circuit board 36 to constitute electrode terminal portions 38 and 39. A plurality of fins 33a are disposed so as to stand in a radial pattern on a rear surface of the positive-side heatsink 33. Positioning resin protruding portions 52, 53, and 54 are disposed through a rear surface of the negative-side heatsink 35 at three positions that include a central portion and two end portions. The rear surface of the negative-side heatsink 35 constitutes a mount surface for the rectifier 12.

A large number of suction apertures 2a and discharge apertures 2b are disposed through the rear bracket 2. A connector portion lead-through opening 2c for connecting an external connector to the connector portion 14 and a B terminal lead-through opening 2d are disposed through respective portions of the rear bracket 2.

A positioning portion 2f for positioning the connector portion 14 is disposed on an inner wall surface of the rear bracket 2, and large suction apertures 2g are disposed opposite the heatsink 22 of the regulator circuit 13. Threaded apertures 55 and 56 for mounting the regulator assembly 40 are cut into an inner wall surface of the rear bracket 2, and an engaging recess portion 56a is recessed in an annular shape around a threaded aperture 56. In addition, threaded apertures 57, 58, and 59 for mounting the rectifier 12 are cut into an inner wall surface of the rear bracket 2 at an approximately uniform pitch circumferentially. Annular engaging recess portions 57a, 58a, and 59a are recessed into the inner wall surface of the rear bracket 2 so as to surround the threaded apertures 57, 58, and 59. A mounting surface 60 for the rectifier 12 is also formed on the inner wall surface of the rear bracket 2 so as to have an arc-shaped flat surface that conforms to the rear surface of the negative-side heatsink 35. Suction apertures 2h are disposed through the rear bracket 2 radially inside the mounting surface 60.

A bearing mount portion 61 is disposed so as to project in an annular shape on the inner wall surface of the rear bracket 2 so as to be coaxial with a central axis. First and second partitioning walls 62 and 63 that have an axial height are disposed integrally on the inner wall surface of the rear bracket 2 so as to extend radially from the bearing mount portion 61 so as to separate a housing space 73 for the rectifier 12 and a housing space 74 for the regulator assembly 40. In addition, a third partitioning wall 64 that has an axial height is disposed so as to project from the inner wall surface of the rear bracket 2 so as to function together with the second partitioning wall 63 to separate a housing space 75 for the B terminal bolt 37 from the housing space 73 for the rectifier 12 and the housing space 74 for the regulator assembly 40.

The rectifier 12 is housed inside the rear bracket 2 in a positioned state by inserting the protruding portions 52, 53, and 54 that are formed on the rear surface of the negative-side heatsink 35 into the engaging recess portions 57a, 58a, and 59a that are formed on the inner wall surface of the rear bracket 2. At that time, the rear surface of the negative-side heatsink 35 is mounted onto the mounting surface 60. In addition, the rectifier 12 is mounted to the rear bracket 2 as shown in FIG. 10 by fastening mounting bolts 65, 66, and 67 into the apertures 57, 58, and 59 that are formed on the inner wall surface of the rear bracket 2.

Next, the regulator assembly 40 is housed between the two end portions of the approximate C shape of the rectifier 12 in a positioned state by fitting the positioning protruding portion 26a that is formed on the base 41 into the engaging recess portion 56a that is formed on the inner wall surface of the rear bracket 2. The regulator assembly 40 is then mounted to the rear bracket 2 as shown in FIG. 8A by passing a mounting bolt 68 through the penetrating apertures 31 and 27 and fastening it into a threaded aperture 55, and by passing a mounting bolt 69 through the penetrating apertures 30 and 26 and fastening it into a threaded aperture 56. In addition, the electrode terminal portions 29 and 46 of the regulator assembly 40 are fastened to an electrode terminal portion 38 of the rectifier 12 by a screw 70, and the electrode terminal portion 28 of the regulator assembly 40 is fastened to an electrode terminal 39 of the rectifier 12 by a screw 71.

Here, the front surface of the straightening vane portion 43 is positioned in a common plane with a surface of the rectifier 12 that faces the blades of the cooling fan 7b so as to constitute a flat annular blade-facing surface. As shown in FIG. 9B, a large portion of the connector portion lead-through opening 2c is closed over by the cover portion 44 of the plate 42 except for the led-through portion of the connector portion 14.

In an automotive alternator that is configured in this manner, air is sucked into the rear bracket 2 through the suction apertures 2a, 2h, and 2g due to rotation of the cooling fan 7b, which operates together with the rotation of the rotor 6.

The air that has been sucked in through the suction apertures 2a and 2h flows radially inward through the housing space 73 for the rectifier 12 along the radial fins 33a of the positive-side heatsink 33, and flows toward the rotor 6 along a central axis from an inner circumferential edge of the positive-side heatsink 33. This housing space 73 for the rectifier 12 constitutes a rectifier cooling airflow passage. The air that has flowed toward the rotor 6 is deflected centrifugally by a cooling fan 7b, cools the coil ends 20, and is discharged externally through the discharge apertures 2b.

The air that has been sucked in through the suction apertures 2g flows radially inward through the housing space 74 for the regulator assembly 40 along the fins 22a of the heatsink 22, which extend radially, passes through the ventilating apertures 41a from an inner circumferential edge of the heatsink 22, and flows along the central axis toward the rotor 6. This housing space 74 for the regulator assembly 40 constitutes a regulator circuit cooling airflow passage. The air that has flowed toward the rotor 6 is deflected centrifugally by the cooling fan 7b, cools the coil ends 20, and is discharged externally through the discharge apertures 2b.

Temperature increases in the positive-side diodes 32 of the rectifier 12 and power transistors of the regulator circuit 13, which constitute heat sources, are suppressed by heat exchange between the heatsinks 22 and 33 and the air that flows along the fins 22a and 33a of the heatsinks 22 and 33. Heat that is generated by the negative-side diodes 34 of the rectifier 12 is also transferred directly to the rear bracket 2 from the negative-side heatsink 35 and is radiated from a surface of the rear bracket 2, suppressing temperature increases in the negative-side diodes 34.

According to the present invention, a housing space 73 for a rectifier 12 and a housing space 74 for a regulator assembly 40 are separated from each other circumferentially by a bearing mount portion 61 and first through third partitioning walls 62, 63, and 64. Thus, flows of air that has been sucked in through suction apertures 2a, 2g, and 2h flow radially inward without flowing circumferentially and interfering with each other, and are smoothed axially. Reverse flow of air that has performed cooling is thereby eliminated, reducing pressure loss, improving cooling performance, and enabling positive-side diodes 32 and power transistors to be cooled effectively.

Now, if air that has been sucked in through a B terminal lead opening 2d flows into the housing spaces 73 and 74, flows to a radially inner side, and then flows toward the rotor 6, the flow rate of air that contributes to cooling is reduced due to flowing along the fins 22a and 33a of the heatsink 22 and 33 inside the housing space 73 and 74 and then flowing toward the rotor 6.

According to the present invention, because a housing space 75 for the B terminal bolt 37 is separated from the housing space 73 for the rectifier 12 and the housing space 74 for the regulator assembly 40 by the second and third partitioning walls, inflow of air that has been sucked in through the B terminal lead opening 2d into the housing spaces 73 and 74 is suppressed. Thus, reductions in the flow rate of air that contributes to cooling due to flowing through the housing space 73 and 74 are suppressed, improving cooling performance.

Because the brush holder portion 10, the regulator circuit housing portion 15, and the connector portion 14 are formed such that their respective center lines are positioned in a common plane that includes the central axis of the rotating shaft 4, exclusive circumferential space for the regulator assembly 40 can be reduced. Thus, exclusive circumferential space for the rectifier 12 that is disposed in a common plane with the central axis of the regulator assembly 40 that is perpendicular to the rotating shaft 4 can be increased, enabling the heat radiating area of the positive-side and negative-side heatsinks 33 and 35 to be enlarged, thereby enabling heat that is generated by the positive-side and negative-side diodes 32 and 34 to be radiated effectively. Because the heat radiating area of the heatsink 22 is not reduced at all, cooling of the power transistors of the regulator circuit 13 does not deteriorate.

Thus, cooling of the rectifier can be improved significantly due to synergism between increased heat radiating area in the rectifier 12 due to the configuration in which respective center lines of the brush holder portion 10, the regulator circuit housing portion 15, and the connector portion 14 are disposed in a common plane that includes a central axis of the rotating shaft 4 and improvements in cooling performance that result from disposing the first through third partitioning walls 62, 63, and 64.

Because the straightening vane portion 43 functions together with the rectifier 12 and the brush holder portion 10 to constitute a flat annular blade-facing surface that faces the blades of the cooling fan 7b, the occurrence of magnetic noise that results from rotation of the cooling fan 7b is suppressed.

Because the connector portion lead-through opening 2c that leads the connector portion 14 out is mostly closed over by the connector portion 14 and the cover portion 44, penetration of water, dust, etc., into the rear bracket 2 from outside is suppressed.

Because the noise-preventing capacitor 48 is embedded integrally into the straightening vane portion 43 of the plate 42, members for mounting the capacitor 48 can be omitted, enabling the number of parts to be reduced, and only the plate 42 needs to be replaced if the capacitor 48 fails, also improving maintainability.

Because ventilating apertures 41a are formed on the regulator assembly 40 radially outside the slinger portion 21, the cooling airflows that have flowed radially inward along the fins 22a of the heatsink 22 flow through the ventilating apertures 41a toward the rotor 6, reducing pressure loss.

Because a protruding portion 26a is formed on the base 41 of the regulator assembly 40, and an engaging recess portion 56a that engages with the protruding portion 26a is formed on the inner wall surface of the rear bracket 2, the regulator assembly 40 can be positioned on the rear bracket 2 easily, facilitating the mounting screw aperture alignment and the electrode terminal portion connecting aperture alignment, and improving assembly.

Because protruding portions 52, 53, and 54 are formed on the rectifier 12, and engaging recess portions 57a, 58a, and 59a that engage with the protruding portions 52, 53, and 54 are formed on the inner wall surface of the rear bracket 2, the rectifier 12 can be positioned on the rear bracket 2 easily, facilitating mounting screw aperture alignment and electrode terminal portion connecting aperture alignment, thereby improving assembly.

Moreover, in the above embodiment, the positioning protruding portion 26a of the regulator assembly 40 is formed around a penetrating aperture 26 on one side of the brush holder portion 10, but one positioning protruding portion may also be formed around each of the penetrating apertures on two sides of the brush holder portion. In that case, some margin of error for threaded aperture alignment, etc., may be eliminated, but there will be no deleterious effects provided that each of the parts is machined accurately.

In the above embodiment, the connector portion 14 projects radially through the rear bracket 2 such that the opening portion 14a faces radially outward, but a connector portion may also be prepared so as to project axially through the rear bracket such that the opening portion faces axially. In that case, radial dimensions of the regulator assembly can be reduced.

What is claimed is:

1. An automotive alternator comprising:
    a rotor that is fixed to a rotating shaft;
    a cooling fan that is fixed to an axial end surface of said rotor;
    a stator that is disposed outside said rotor so as to surround said rotor;
    a front bracket and a rear bracket that rotatably support said rotating shaft and that fix said stator, and in which are formed a suction aperture that sucks in air by action of said cooling fan and a discharge aperture that discharges said air that has been sucked in;
    a rectifier comprising:
    an approximately C-shaped rectifier heatsink to which a plurality of diodes are mounted; and
    a resin circuit board in which said plurality of diodes are connected by insert conductors so as to constitute a rectifier circuit,
    said rectifier being mounted to said rear bracket so as to be disposed around said rotating shaft in an approximate C shape and rectifying alternating-current output that is generated by said stator into direct current;
    a regulator circuit that is fixed to a regulator heatsink, and that adjusts magnitude of alternating-current voltage that is generated by said stator;
    a regulator assembly that has a base into which is integrally molded:
    a brush holder portion that is disposed so as to face said rotor such that an aperture direction of a brush insertion aperture is aligned in a radial direction and that holds a brush inside said brush insertion aperture;
    a regulator circuit housing portion that is disposed on a rear bracket side of said brush holder portion such that a resin injection aperture faces radially outward, and that houses and holds said regulator circuit such that fins of said regulator heatsink are oriented toward said rear bracket; and
    a connector portion that is disposed on a rear bracket side of said brush holder portion,
    said regulator assembly being mounted to said rear bracket such that said base is disposed between two end portions of said approximate C shape of said rectifier,
    wherein:
    said brush holder portion, said regulator circuit housing portion, and said connector portion are formed so as to be positioned such that respective center lines thereof are in a common plane that includes a central axis of said rotating shaft;
    a partitioning wall is disposed so as to project from an inner wall surface of said rear bracket so as to separate a rectifier cooling airflow passage for cooling said rectifier and a regulator circuit cooling airflow passage for cooling said regulator circuit by stopping circumferential flow of said air that is sucked in through said suction aperture to cool said rectifier and said regulator circuit respectively;
    said connector portion is disposed so as to be adjacent to a radially outer side of said regulator circuit housing portion;
    said regulator assembly further comprises a resin plate that is mounted onto said brush holder portion, and that has a cover portion that closes said resin injection aperture; and
    a noise-preventing capacitor is embedded in said plate, said capacitor being disposed so as to be adjacent to a first circumferential side of said brush holder portion and so as to extend along the extending direction of said brush holder portion.

2. An automotive alternator according to claim 1, wherein:
    an output terminal of said rectifier is extended outward through an output terminal lead-through opening that is disposed through said rear bracket; and
    said partitioning wall is further formed so as to stop air that has been sucked in through said output terminal lead-through opening from flowing into said rectifier cooling airflow passage and said regulator circuit cooling airflow passage.

3. An automotive alternator according to claim 1, wherein said connector portion projects radially outward.

4. An automotive alternator according to claim 1, wherein a ventilating aperture that allows said air that has flowed radially inward through said regulator circuit cooling airflow passage to flow axially is formed radially inside said regulator circuit housing portion of said base.

* * * * *